(No Model.)
F. M. & W. E. KING.
FERTILIZER DISTRIBUTER AND PLANTER.
No. 310,208. Patented Jan. 6, 1885.
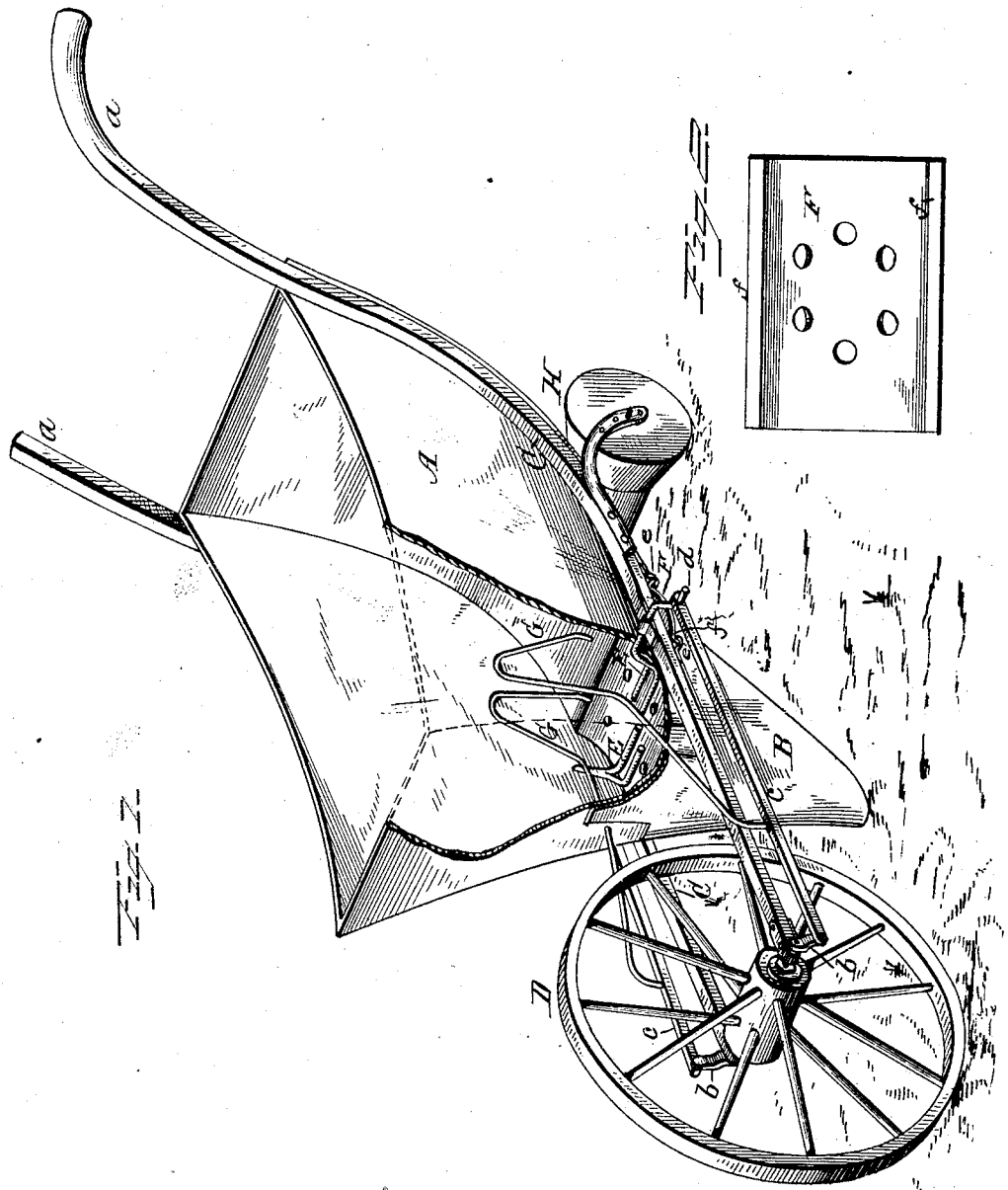
WITNESSES
F. L. Ourand
L. L. Miller
INVENTORS
Francis M. King,
William E. King,
per Chas. H. Fowler
Attorney

United States Patent Office.

FRANCIS M. KING AND WILLIAM E. KING, OF WILMINGTON, N. C.

FERTILIZER-DISTRIBUTER AND PLANTER.

SPECIFICATION forming part of Letters Patent No. 310,208, dated January 6, 1885.

Application filed June 9, 1884. (No model.)

*To all whom it may concern:*

Be it known that we, FRANCIS M. KING and WILLIAM E. KING, citizens of the United States, residing at Wilmington, in the county of New Hanover and State of North Carolina, have invented certain new and useful Improvements in Fertilizer-Distributers and Planters; and we do hereby declare that the following is a full, clear, and exact description of the same, reference being had to the annexed drawings, making a part of this specification, and to the letters and figures of reference marked thereon.

Figure 1 of the drawings is a perspective view of a fertilizer-distributer and planter constructed in accordance with our invention, with a portion of the hopper broken away to show the interior thereof; and Fig. 2, a detail view of one of the gage-plates.

The present invention has relation to certain new and useful improvements in fertilizer-distributer and planter, as will be hereinafter described and claimed.

In the accompanying drawings, A represents the hopper provided with the discharge-spout B, said hopper being suspended by the shafts C, which terminate in handles $a$ at the rear end of the hopper, the forward ends of the shafts having mounted thereon the wheel D. To the axle of this wheel, at each end thereof, is keyed or otherwise rigidly secured cranks $b$, which are in turn connected to operating-rods $c$. The opposite ends of rods $c$ are secured to the crank ends $d$ of forked feeders E, by which means a continuous vibratory motion is imparted thereto in opposite directions and upon the arc of a circle, the shanks of the feeders having their bearing in suitable boxes secured to the shafts C, and pass through the sides of the hopper.

Between the hopper A and spout B is located the interchangeable gage-plate F, supported by flanges $e$, secured to the under side of the shafts, with which engage flanges $f$ upon the edges of the gage-plate, or any means may be provided that will secure the plate in place and admit of its ready removal for the purpose of substituting others.

It is the purpose of the invention to provide a series of gage-plates, each having a different number and size of perforations and differently located in the plate, as circumstances require. To withdraw the gage-plate, the end of the connecting-rod $c$ upon the left-hand side of the hopper is slipped off the crank end of the feeder E and the crank turned up out of the way of the plate, when the latter can be readily removed.

To the rods $c$ are connected one end of the agitators G, the same passing through the forward end of the hopper a sufficient distance to be located over the gage-plate F, as shown.

In the rear of the spout B is the coverer H, which also performs the functions of a roller by its peculiar shape. The spout B extends down sufficiently below the hopper A as to serve the double purpose of a discharge and an opener.

The agitators G, by means of their connections, have both a rising upward and rearward motion in opposite directions or alternately, thereby avoiding the tendency of the arching of the contents of the hopper, especially the liability of arching over the discharge, which is wholly prevented.

The shafts C are so bent as to form the frame and handles of the machine, thereby rendering it extremely light and easy to handle as well as enabling it to be manufactured at a comparatively small cost.

Having now fully described our invention, what we claim as new, and desire to secure by Letters Patent, is—

1. In a fertilizer-distributer and planter, the combination, with a suitable hopper and spout, of interchangeable gage-plates and agitators, and feeders having an alternative motion both vertically and horizontally over said gage-plates, substantially as and for the purpose set forth.

2. In a fertilizer-distributer and planter, the combination, with forked feeders terminating at their outer ends in cranks, of rods connecting therewith and with cranks on the axle of the driving-wheel, and agitators connected to the rod and extending through and into the hopper over the feeders, and operating in connection therewith, substantially as and for the purpose specified.

In testimony that we claim the above we have hereunto subscribed our names in the presence of two witnesses.

FRANCIS M. KING.
WILLIAM E. KING.

Witnesses:
JOHN F. MAUNDER,
E. T. HANCOCK.